United States Patent Office

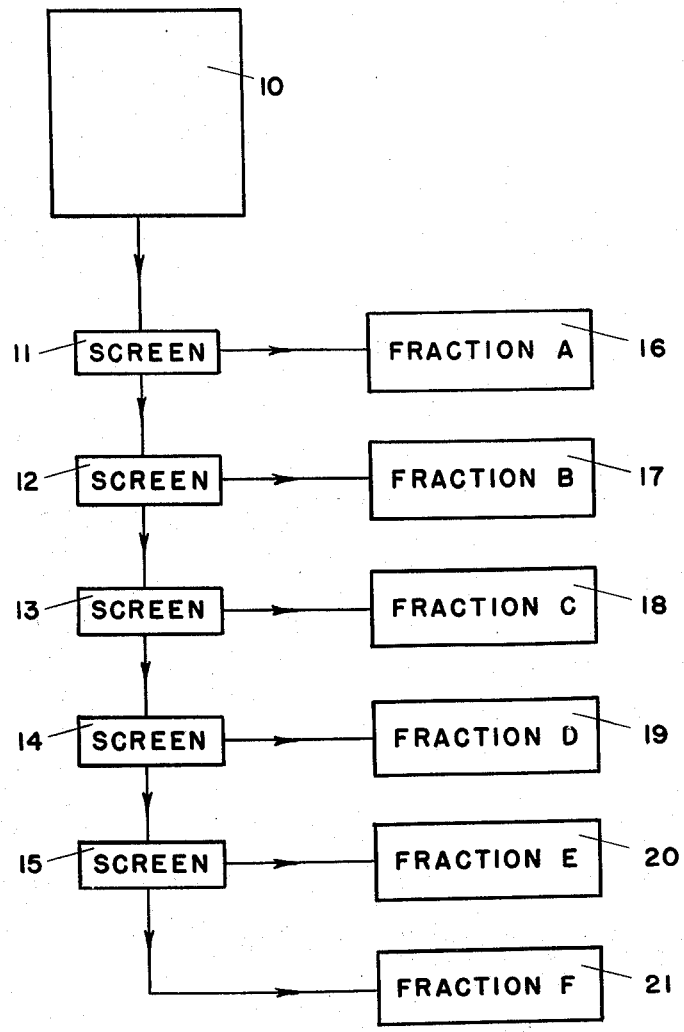

2,960,724
Patented Nov. 22, 1960

2,960,724
PROCESS FOR PREPARING, BY A MECHANICAL WAY, POLYETHYLENES WITH HOMOGENEOUS PHYSICO-CHEMICAL PROPERTIES

Henri Sack, Sainte-Genevieve-des-Bois, and Charles Cousin, Labuissiere, France, assignors to Etablissement Public dite: Houilleres du Bassin du Nord et du Pas-de-Calais, Douai, France Filed Feb. 7, 1957, Ser. No. 638,677
Claims priority, application France Mar. 9, 1956
5 Claims. (Cl. 18—48)

This invention relates to a process for producing through operations of a mechanical character polyethylene products having uniform physico-chemical properties from crude polymer stock having non uniform granulometry and characteristics. The invention further comprises the different polyethylene fractions possessing homogeneous characteristics, as obtained by said process and articles prepared from such fractions.

It is known to manufacture polyethylene products having crystalline structure, e.g. by processes involving a heterogeneous phase and a non-solvent liquid medium, broadly known by the term "Ziegler polymerization" as well as methods derived therefrom.

It is also known that the resulting macromolecules have their molecular masses spread over a rather broad range, and that the spread varies with the physical condition, the nature of the catalysts used, the pressure at which the synthesis is conducted, the temperature used and the nature of the non-solvent liquid serving as a carrier and a dispersing agent for the catalyst and the polymers during formation; a characteristic of such liquids lying in the fact that the polymers formed are not soluble therein under the operating conditions. The macromolecules which form under such conditions appear in the form of a precipitate or suspension which, after filtering and possibly a washing stage, yields a powder which is heterogeneous as to its particle size.

Another known consideration is that the molecular masses of polymers vary directly with their inherent viscosity so that the values of and variations in such viscosity provide a means of estimating the molecular masses of the macromolecules and assessing the variations therein.

In another connection, as regards the utilization of such macromolecules, surface defects known as "fish-eggs" are often known to occur e.g. during moulding, such defects being inclusions of macromolecules which failed to participate in the fusion. Similarly it is known that the presence of polymers having excessively low molecular masses and excessive degrees of crystallization imparts brittleness to the moulded articles especially when they are annealed or fired and slowly cooled.

The surprising discovery has now been made, which was unpredictable in the present state of knowledge in the field of macromolecular physics, that, to each particle size in a powder resulting from a given polymerization process, there corresponds a particular average molecular mass differing from that corresponding to any other size, and hence particular physico-chemical properties.

The invention accordingly consists in subjecting a crude ethylene polymerization product to a granulometric fractionating treatment, each homogeneous granulometrical fraction being separated to provide a polyethylene stock having inherent physico-chemical properties differing from those of other fractions.

Thus it has been found that a polyethylene from which the larger particles have been eliminated by any suitable operating procedure—which larger particles have been observed to be at least partly reticulated—leads to the production of moulded products free of the above mentioned surface defects. On the other hand the introduction of large-particle-size fractions into a powder of the same size increases the tendency to the formation of such surface defects.

Conversely removing the finer fractions from a polyethylene powder permits the moulding of articles free of the defect of brittleness after firing and cooling.

In other words the invention may involve, in connection with an ethylene polymer stock, both removing of those fractions responsible for defects found to occur in the articles obtained by moulding or otherwise shaping the polymer, and grouping certain ones among the said fractions preliminarily separated from one another, with the purpose of improving known types of articles or creating novel types, suited for new practical uses.

The invention will now further be described in detail with reference to the accompanying drawing diagrammatically illustrating apparatus by which the gross or aggregate polymer stock may be mechanically separated into fractions.

The manner of mechanically separating the gross or aggregate polymer stock into fractions comprising particles of predetermined size may involve any known sorting or screening technique, such as: filtering in a non-solvent liquid medium, screening in a dry or nonsolvent liquid medium, and in some instances, centrifuging segregation by means of an entraining current of inert gas, and so on.

Referring to the drawing in detail, it will be seen that a plant for separating the gross or aggregate polymer stock into several fractions which respectively consist of particles having a substantially uniform granular size may include a vessel or tank 10 containing powdered raw polyethylene stock resulting from a reaction in a non-solvent liquid medium, that is, a "Ziegler polymerization," and a number of separating screens, for example, the screens 11, 12, 13, 14 and 15, having progressively increasing numbers of wires per linear inch. The gross or aggregate polymer stock is fed from tank 10 to the screen 11 having the largest openings therein, and the fraction A having particles larger than the openings of screen 11 are collected in a receptacle 16. The particles which pass through the screen 11 are fed to the next screen 12 and the fraction B having particles of a size smaller than the openings in screen 11, but larger than the openings in screen 12 are collected in a receptacle 17. The particles which pass through the screen 12 are fed to the next screen 13, and the fraction C having particles of a size smaller than the openings of screen 12, but larger than the openings of screen 13 are collected in a receptacle 18. The particles passing through the screen 13 are fed to the next screen 14, and the fraction D consisting of particles having a size smaller than the openings of screen 13, but larger than the openings of screen 14 are collected in a receptacle 19. The particles passing through the screen 14 are fed to the screen 15, and the fraction E consisting of particles having a size smaller than the openings of screen 14, but larger than the openings of screen 15 are collected in a receptacle 20. Finally, the residual fraction F consisting of particles having a size smaller than the openings of screen 15, and thus passing through the latter, are collected in a receptacle 21. From the foregoing, it is apparent that conventional dry screening techniques can be conveniently employed for effecting the mechanical separation of the gross or aggregate polymer stock into the several fractions A, B, C, D, E and F respectively consisting of particles having a substantially uniform granular size, and for which it has been found there is a corresponding average molecular mass, and hence particular physico-chemical properties, differing from the average molecular mass and physico-chemical properties of each of the other fractions.

With some mechanical separating procedures however there occurs a formation of static electric charges which interfere with the process in that they cause the finer particles to cling to the larger ones; in such cases techniques should be used which will eliminate the disturbing static charges.

The non-restrictive examples that follow will illustrate the practical manner of performance of the invention and at the same time indicate some of the possibilities that are made available thereby.

*Example 1.*—Crude polyethylene stock obtained by the afore-mentioned Ziegler process is subjected to granulometric fractionating, the operating conditions of the polymerization being as follows:

Catalyst: tri-isobutyl-aluminium + titanium chloride.
Non-solvent reagent medium: cyclohexane.

Separation is performed by dry screening, for example, in a plant of the kind diagrammatically illustrated in the drawing.

The granulometrical analyses as well as the main properties of the fractions obtained are listed in the following table wherein each fraction is identified by a screen number designating the mesh size or number of wires per linear inch.

| Test Characteristic | Gross Polymer | Fractions | | | | | |
|---|---|---|---|---|---|---|---|
| | | Oversize Screen 20 | 20–30 | 30–80 | 80–120 | 120–180 | Undersize Screen 180 |
| Weight percent of fractions | 100 | 4 | 2.5 | 10.5 | 44 | 26.4 | 12.6 |
| Inherent viscosity at 20° C. (at 0.2% concentration in decaline at 135° C., and with extrapolation of pressure gradient to zero). | 10.2 [1] | non-measurable | non-measurable | 12.2 | 11.2 | 9.3 | 8.5 |
| Percent insoluble in decaline at 135° C | 2.6 | 90 | 10 | 0 | 0 | 0 | 0 |
| Melting point (on heated microscope slide viewed through crossed nicol analyser prisms): | | | | | | | |
| (1) range | 128–132 [2] | 126–129 | 131–136 | 123–126 | 120–124 | 129–141 | 119–124 |
| (2) average value | 130 | 127.5 | 133.5 | 124.5 | 122 | 134.5 | 121.5 |
| Melt viscosity (with Hoeppler "consistometer," No. 2 Model, load 12 kg. $t=170°$ C.), in poises. | $2.7 \cdot 10^6$ | non-measurable | negligible | $7 \cdot 10^6$ | $4.6 \cdot 10^6$ | $1.5 \cdot 10^6$ | $0.75 \cdot 10^6$ |
| Hardness (with Hoeppler consistometer cone, 12 kg. load, $t=20°$ C.). | 840 | | | 1,006 | 917 | 903 | 880 |
| Aspect through polarizer microscope | Heterogeneous | Moderate-size spherulites | High-density, large and small-size spherulites | small-size spherulites | Very fine texture | | |

[1] Approximate only, due to difficulty in providing a representative average sample and presence of the portions insoluble in decaline at 135° C.
[2] Significance of these values is questionable due to the heterogeneous character of the average sample.

After the fractionating operation the following results were obtained:

(*a*) After removal of the oversize from screens 20 and 30 (which include portions that are at least partly reticulated and hence are not stretchable), a marked improvement was noted in the performance of the product on extrusion, yielding uniform threads having an increased elongation rate.

(*b*) On removal of the oversize from the screens above 50, the melt viscosity of the residual product is found to increase very considerably, so that the extrusion rate and hence the rate of the moulding cycles may be increased.

(*c*) Conversely if it is desired to start from a polyethylene batch of low molecular weight, and improve the inherent viscosity thereof e.g. from 3 to 5, so as to render the product suitable for certain applications, this can be done by incorporating in the product a certain quantity of the above listed 30–80 fraction which has an inherent viscosity of 12 and does not contain any low-molecular material.

*Example 2.*—The starting stock is Ziegler polyethylene of the type described in "Angewandte Chemie," 1955, 67, pages 548 and foll., which has the recognized defect of being brittle after firing, and which is revealed by granulometric analysis to contain products having excessively low molecular weight and two highly crystallized.

The product is subjected to a separating process according to the invention with the following results:

(*a*) After removal of all particles smaller in size than mesh size 150, the product no longer displays the defect of brittleness after firing and cooling.

(*b*) The undersize fraction from screen 150 thus separated in turn is ideally suited for delicate mouldings owing to its low melt viscosity ($10^3$ poises in the conditions indicated in the above table). It is simply necessary thereafter to subject the moulded articles to reticulation by conventional methods such as ionizing radiation, oxidation, etc.

What we claim is:

1. In a method of producing polyethylene articles, screening powdered raw polyethylene stock resulting from a reaction in a non-solvent liquid medium into fractions the particles of which have a substantially uniform granular size for each fraction under electrically neutral conditions.

2. In a method of producing polyethylene articles free of surface defects, screening powdered raw polyethylene stock resulting from a reaction in a non-solvent liquid medium, removing a substantially fine-grained fraction, and moulding the residual stock.

3. In a method of producing non-brittle polyethylene articles, screening powdered raw polyethylene stock resulting from a reaction in a non-solvent liquid medium, removing a substantially fine-grained fraction, and moulding the residual stock.

4. In a method of producing polyethylene articles having specified physico-chemical characteristics, screening powdered raw polyethylene stock resulting from a reaction in a non-solvent liquid medium into fractions the particles of which have a substantially uniform granular size for each fraction, blending selected fractions in predetermined proportions so as to provide a resulting material having physico-chemical characteristics which are desirable for articles to be formed therefrom.

5. In a method of producing polyethylene articles, separating powdered raw polyethylene stock resulting from a reaction in a non-solvent liquid medium into fractions the particles of which have a substantially uniform granular size for each fraction under electrically neutral conditions, whereby the particles of each fraction possess characteristic and substantially uniform molecular mass and physico-chemical properties.

References Cited in the file of this patent
UNITED STATES PATENTS

| | | |
|---|---|---|
| 2,463,680 | Corrigan | Mar. 8, 1949 |
| 2,710,991 | Squires et al. | June 21, 1955 |
| 2,736,925 | Heisler et al. | Mar. 6, 1956 |
| 2,833,755 | Coover | May 6, 1958 |